(12) United States Patent
Gabl

(10) Patent No.: US 7,267,231 B2
(45) Date of Patent: Sep. 11, 2007

(54) PROCESS AND DEVICE FOR AERATING SUSPENSIONS

(75) Inventor: Helmuth Gabl, Graz (AT)

(73) Assignee: Andritz AG, Graz (AT)

(*) Notice: Subject to any disclaimer, the term of this patent is extended or adjusted under 35 U.S.C. 154(b) by 435 days.

(21) Appl. No.: 10/785,848

(22) Filed: Feb. 24, 2004

(65) Prior Publication Data

US 2006/0144796 A1    Jul. 6, 2006

(30) Foreign Application Priority Data

Feb. 25, 2003    (AT)    ................. A 271/2003

(51) Int. Cl.
*B03D 1/24*    (2006.01)
*D21C 5/02*    (2006.01)

(52) U.S. Cl. .................... 209/168; 209/170; 162/4

(58) Field of Classification Search .......... 209/170, 209/169, 168; 162/55, 60, 4
See application file for complete search history.

(56) References Cited

U.S. PATENT DOCUMENTS 4,186,094 A * 1/1980 Hellberg .................. 210/221.2
5,330,655 A * 7/1994 Schweiss et al. .......... 210/703

FOREIGN PATENT DOCUMENTS

| CA | 2101225 | * | 1/1994 |
| CA | 1335147 | * | 4/1995 |
| DE | 3144561 | * | 5/1983 |
| DE | 4238336 | * | 5/1994 |
| GB | 2036603 | * | 7/1980 |
| WO | 96/16743 | * | 6/1996 |

OTHER PUBLICATIONS

Pfalzer, Lotar, "The injector cell- a low energy flotation machine", TAPPI, Oct. 1982, vol. 65, No. 10, pp. 73-76.*

* cited by examiner

*Primary Examiner*—Thomas M. Lithgow
(74) *Attorney, Agent, or Firm*—Alix, Yale & Ristas, LLP

(57) ABSTRACT

A process for aerating suspensions, particularly to flotate them, for example in deinking of pulp suspensions, with one or more stages and/or cells. Each stage/cell has its own separate liquid loop. A cleaner is interposed to improve removal of dirt specks.

11 Claims, 6 Drawing Sheets

PROCESS AND DEVICE FOR AERATING SUSPENSIONS

BACKGROUND OF THE INVENTION

This invention relates generally to processes for aerating suspensions. More particularly, the present invention relates to processes for floating suspensions, for example in deinking of pulp suspensions, with one or more stages and/or cells, where each stage/cell has its own separate liquid loop. In addition, the invention relates to a device for implementing the process.

Re-use of printed papers containing a high concentration of minerals (pigments, such as calcium carbonate and kaolin) requires process adjustments in the recycling process and in repulping during the deinking process.

For the recycling process, the input of non-fibrous substances (printing ink, minerals, etc.) involved is problematical. Operators of waste-paper treatment plants are forced to target removal of excess printing ink and mineral substances. Deinking flotation is a process for removing contaminants and printing ink particles from fibre pulp suspensions, particularly those produced in waste-paper treatment. Since it uses air bubbles to remove the ink particles, this process has only limited suitability for targeted removal of dirt specks at the same time, together with efficient ash removal and/or reduction of fines at low fibre loss.

Hydrophobic solids, or solids that have been rendered hydrophobic by means of surface-active substances, such as printing ink particles, etc., are carried to the surface of the liquid by the air bubbles adhering to them and can be removed there as foam. Depending on process management, dirt specks and fillers are removed more or less non-specifically along with the hydrophobic solids.

Examples of conventional processes are provided in EP 1 124 001 A2 or EP 1 262 593 A1, where the individual flotation stages can also be designed according to U.S. Pat. No. 4,255,262, EP 0 243 690, DE 31 20 202, or U.S. Pat. No. 6,208,549, for example. Processes of this type are used to remove contaminants and printing ink particles from pulp suspensions, particularly those produced in waste paper treatment. By applying this type of process, non-specific removal of mineral components (e.g. fillers, etc.) is achieved because their chemical surface properties (particularly loading) are such that they react differently to the ink particles in the pulp suspension, which are relatively easy to render hydrophobic. In addition, the specific weight of the mineral components is approximately two to three times higher than that of the ink particles. In the processes known, however, some disadvantages occur in selective flotation. If, for example, we try to target the removal of fillers by making certain changes to the process, this always results in a drop in the efficiency of printing ink and dirt speck removal, thus there is a need for additional changes in gas loading, adjustments to the raw material fluctuations, and changes in throughput. Furthermore, if the overflow quantity is increased in order to raise the removal rate of dirt specks and mineral substances, the fibre loss rises in equal proportion to this, which leads to greater expense for disposal and raw materials required. Dirt specks are very difficult to remove from the flotation process because of their particle size and the flow resistances prevailing in the tank.

SUMMARY OF THE INVENTION

The aim of the invention is to reduce or avoid the above disadvantages, while maintaining the same flow path and gas loading.

The invention is thus characterized by the dirt specks being removed selectively from at least one liquid loop, where dirt speck removal can be interposed in the liquid loop of one cell, for example a primary or secondary cell, or between the cell stages, i.e. between primary and secondary cells. As a result, it is possible to remove primarily dirt specks, but also printing ink, selectively and simply.

If the pulp suspension is diluted to a consistency of some 0.4-1.7%, particularly 0.8-1.3%, before entering the secondary cells, the flotation efficiency can be increased.

If, according to an advantageous further development of the invention, one dirt speck removal stage each is interposed into the loop of at least two cells, dirt speck removal can be further improved substantially.

It is particularly advantageous if the dirt speck removal stage is followed by a washing process to remove ash.

If the accept flows from the at least two dirt speck removal processes and any subsequent washing processes are fed together here to a further washing process (so-called double washing), a further increase can be achieved in the amount of ash removed at reduced fibre loss.

A favorable further development of the invention is characterized by the accept being fed to a medium-consistency slot screen. This has proved particularly advantageous if the at least two dirt speck removal processes are interposed into the primary cells loop.

It is particularly favorable if the injector pump offers a pressure increase of 1.0 to 2.5 bar, preferably between 1.2 and 1.6 bar.

Furthermore, the invention relates to a device for aerating suspensions, particularly to flotate them, for example in deinking of pulp suspensions, with one or more stages and/or cells, where each stage/cell has its own separate liquid loop. According to the invention, this device is characterized by a cleaner being interposed, where the cleaner can be interposed into the liquid loop of one cell, for example a primary or secondary cell and/or between the cell stages, i.e. between primary and secondary cells.

If, according to the invention, one cleaner each is interposed into the loop of at least two cells, removal of dirt specks can be further improved substantially.

It is particularly advantageous if the cleaner is followed by a washer.

If the accept flows from the at least two cleaners and from any subsequent washers are fed together to a further washer, a further increase can be obtained in ash removal.

A further reduction in the fibre losses while diminishing the volume flows from the flotation washing system can be achieved by post-washing of the reject flows collected.

Furthermore, it has provided advantageous to interpose the at least two cleaners and any subsequent washers into the loop of primary cells.

A favorable configuration results if the cleaner is designed as a (hydro-) cyclone or cyclone block, where the cyclone or cyclone block may have a degassing unit.

An advantageous further development of the inventions is characterized by the injector pump offering a pressure increase of 1.0 to 2.5 bar, preferably between 1.2 and 1.6 bar.

A further advantage is that secondary flotation can be omitted entirely as a result of favorable cleaning of the suspension.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
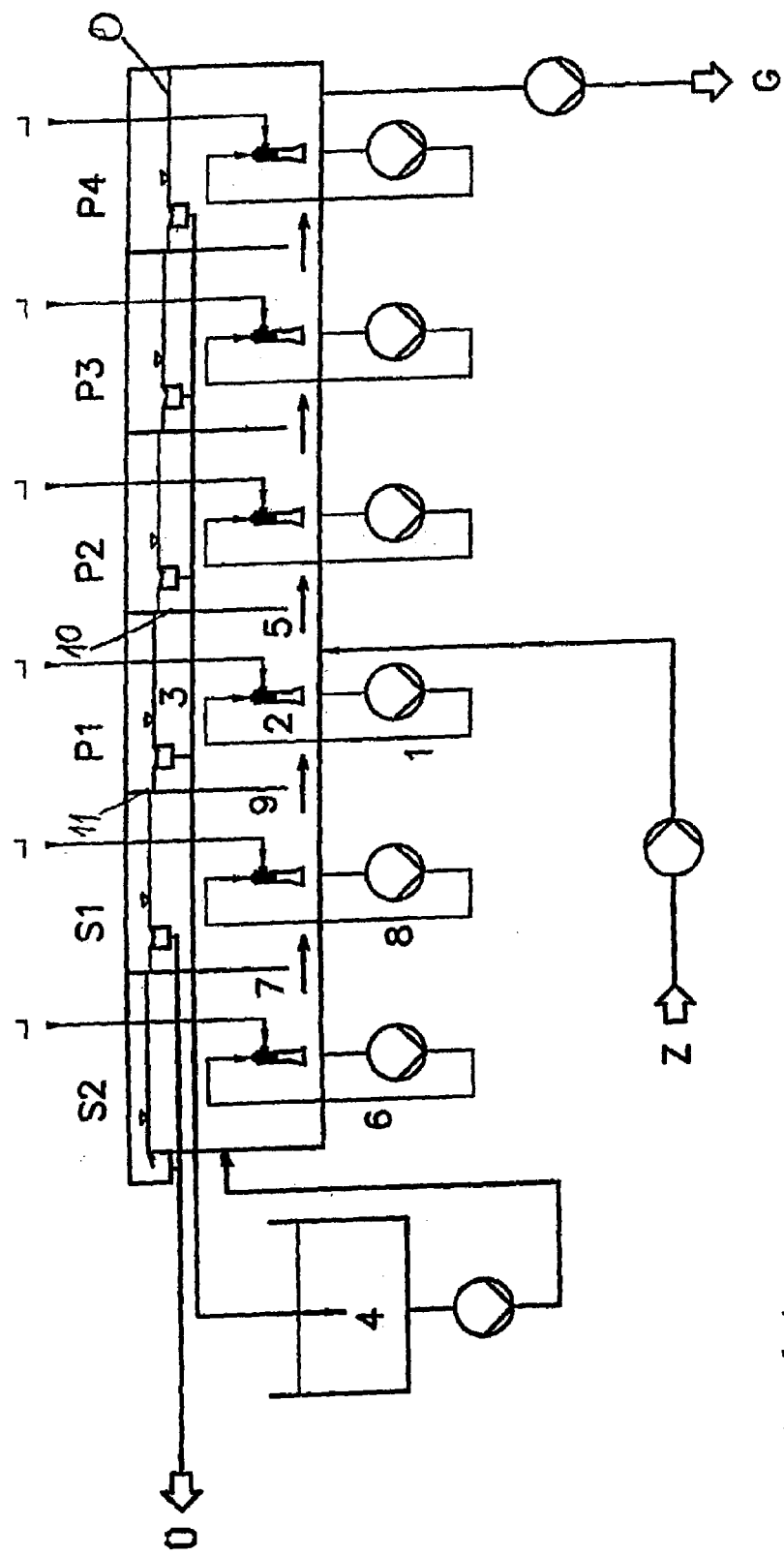
FIG. 1 is a schematic diagram of a conventional flotation plant.

FIG. 1 contains a schematic diagram of a flotation plant according to the state of the art with four primary cells, P1, P2, P3 and P4, and two secondary cells, S1 and S2. The flow of pulp suspension Z is brought into the first primary cell P1 at a suitable point. The bubbles are generated inside this cell via loop 1, which is partly disconnected from the feed, by the injector 2 drawing in air L and mixing it into the suspension. The entire flotation plant is largely filled with suspension, on the surface O of which a foam forms, containing as much as possible of the substances and ink particles to be removed by flotation. The accept flow cleaned to remove ink and contaminants in primary cell P1 is transferred to the second primary cell P2 through an opening 5 located at the base of the dividing wall 10. There and in all other primary cells the suspension is treated in the same way, with bubble generating injectors which are operated by internal cell loops, and is discharged at the end of the plant as accept G. The foam collected from all primary cells P1 to P4 can drain off down a foam channel 3 into a tank 4. The overflow from this intermediate tank 4, from which the foam has largely been removed in the meantime, is fed to the secondary cell S2. Gas loading takes place here again as the suspension flows round the internal cell loop 6. The accept from the secondary cell S2 is transferred to the secondary cell S1 through the opening 7 located at the base. After gas loading using loop 8, the foam from the secondary cells can be removed as overflow Ü. The accept from the secondary cell S1 enters the first primary cell P1 through the opening 9 in the dividing wall 11 located at the base.

Figure 2:
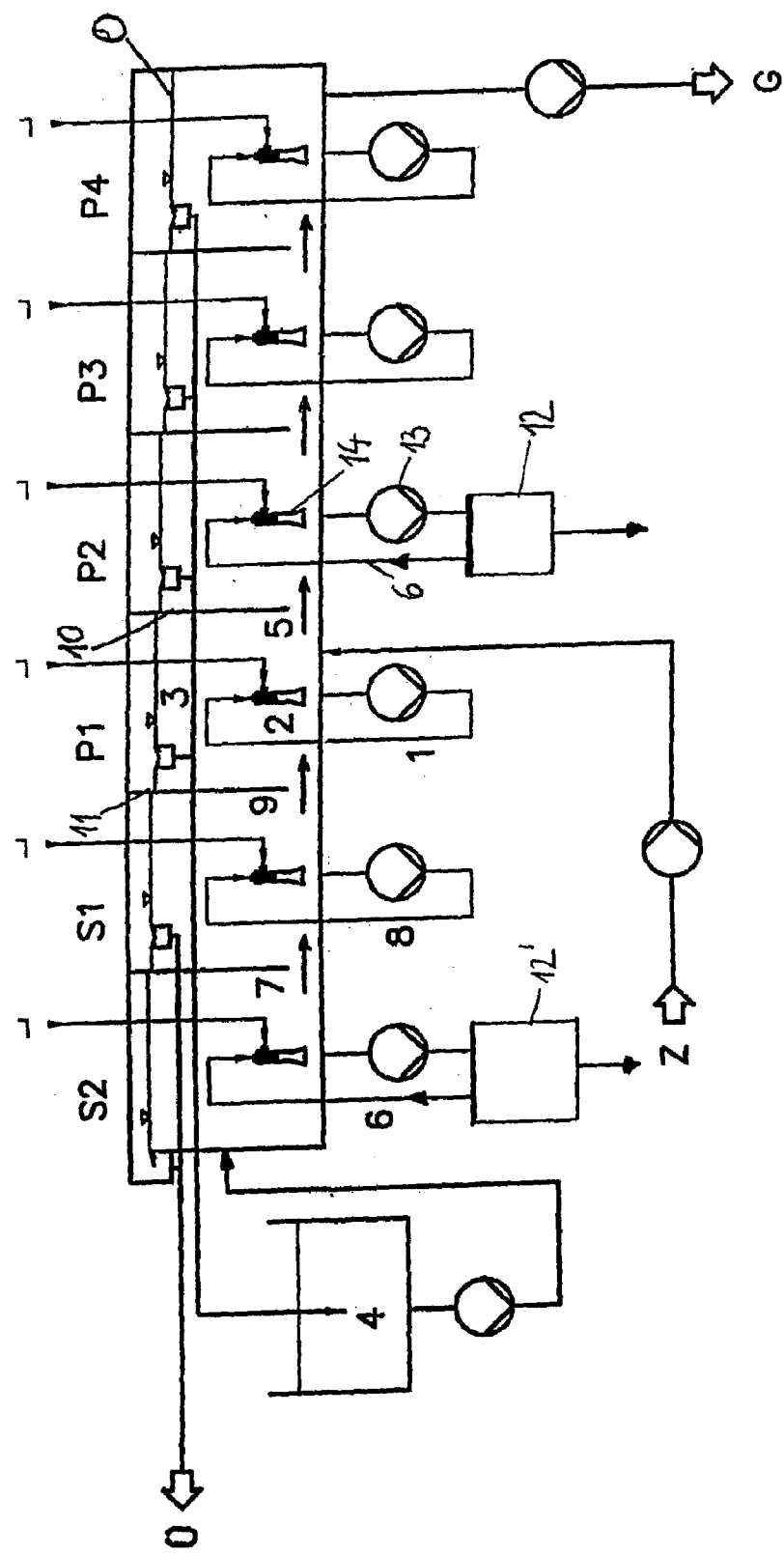
FIG. 2 is a schematic diagram of a first embodiment of flotation plant in accordance with the invention.

As a basic principle, the dirt speck removal stage according to the invention can be interposed at several points. It can be inserted into the loop of a primary cell, a secondary cell, or between the primary and secondary stages. FIG. 2 shows the dirt speck removal stage interposed in a primary stage and in a secondary stage. The dirt speck remover (cleaner) 12 is installed at one of the primary cells (P1, P2, P3, P4), depending on the desired process management and cleanness requirements. As an alternative or in addition, one dirt speck removal stage (cleaner) 12' can be interposed in the loop of a secondary cell (S1, S2). As an example, FIG. 2 shows a dirt speck remover (cleaner) 12 at P2 and a cleaner 12' at S2. The cleaner 12, 12' is installed downstream of an injector pump 13. Compared with the state of the art, in the invention the injector pump 13 provides a higher pressure output at the same throughput in order to overcome the high pressure drop (0.8 to 2.0 bar, preferably 1.2 to 1.6 bar) caused by the hydro-cyclone installed between the injector pump and cleaner. An ash removal stage can also be included in combination with a hydro-cyclone. In the process sequence the cyclone is installed preferably upstream of the ash removal machine. In order to increase the dirt speck removal efficiency in the cyclone, the suspension should be de-aerated when using conventional coarse cleaners. If so-called degassing cleaners are used, removal of fine matter is particularly significant. Depending on the type of raw material and the characteristics of the dirt specks, the high air content in the suspension may enhance removal of dirt specks (centrifugal flotation). A part flow of the liquid is drawn off near the base of the cell P2, S2 before the content drains into the next cell and enters the same cell after the dirt specks have been removed in the cleaner 12, 12' and the pulp consistency set by means of the diffuser 14, 14'. There is also the possibility of interposing a cleaner between several cell chambers. The substances removed in the cleaner 12, 12' are brought to a waste water treatment plant. The degree of ash removal can be set with the usual machine parameters. By setting the injector flow rate independently of production, according to the state of the art as shown in FIG. 1, it is also possible to coordinate the degree of dirt speck removal in the market pulp.

If, according to the invention, forward feed of the entire production flow is requested or if a washing stage is to be installed in an existing DIP plant, the ash can also be removed from the entire flow between the cells. In order to retain the flotation efficiency, the loop must be opened and the pulp consistency further diluted, preferably to approximately 0.8 to 1.3%.

Figure 3:
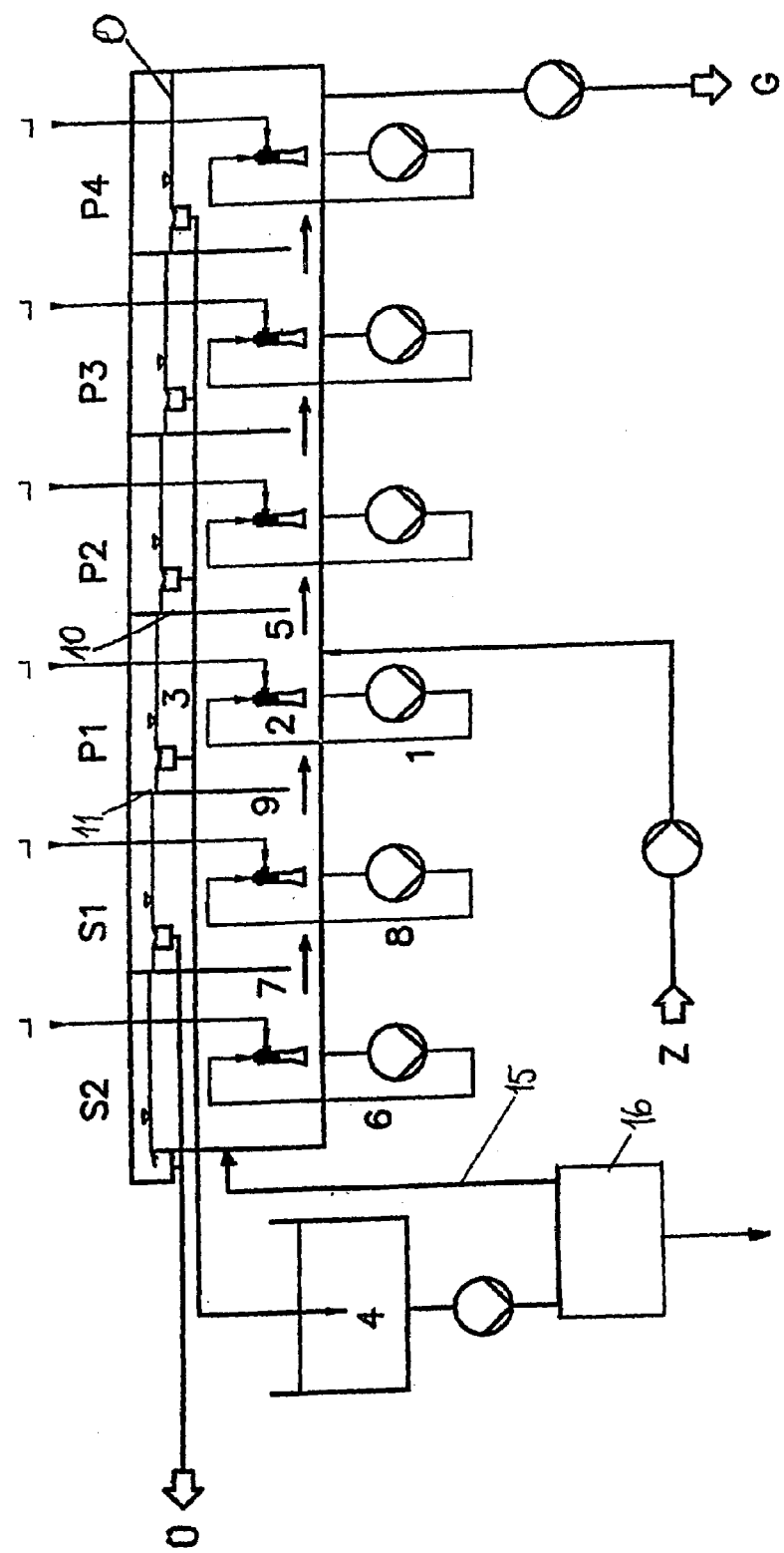
FIG. 3 is a schematic diagram of a second embodiment of flotation plant in accordance with the invention.

In FIG. 3, the feed 15 to the secondary cell is treated in a cleaner 16, acting as dirt speck removal device, such that the hydraulic load in the secondary cells is reduced due to removal of dirt specks and ink particles. The fundamental aspect here, however, is targeted removal of dirt specks. The variant in FIG. 3 shows the most effective form of partial flow treatment because the foam is already enriched considerably with mineral substances and dirt specks during the flotation process. Interposition of cleaners at this point permits reliable and efficient discharge of dirt specks with positive reinforcement of ash removal in reject flows that are hydraulically small, but have high loading.

In the ash removal process the accept is thickened. In order to ensure that the pulp consistency is not too high in secondary flotation, the pulp suspension is normally diluted to approximately 0.6 to 1.4%. This process is needed in all removal procedures within the flotation plant.

Figure 4:
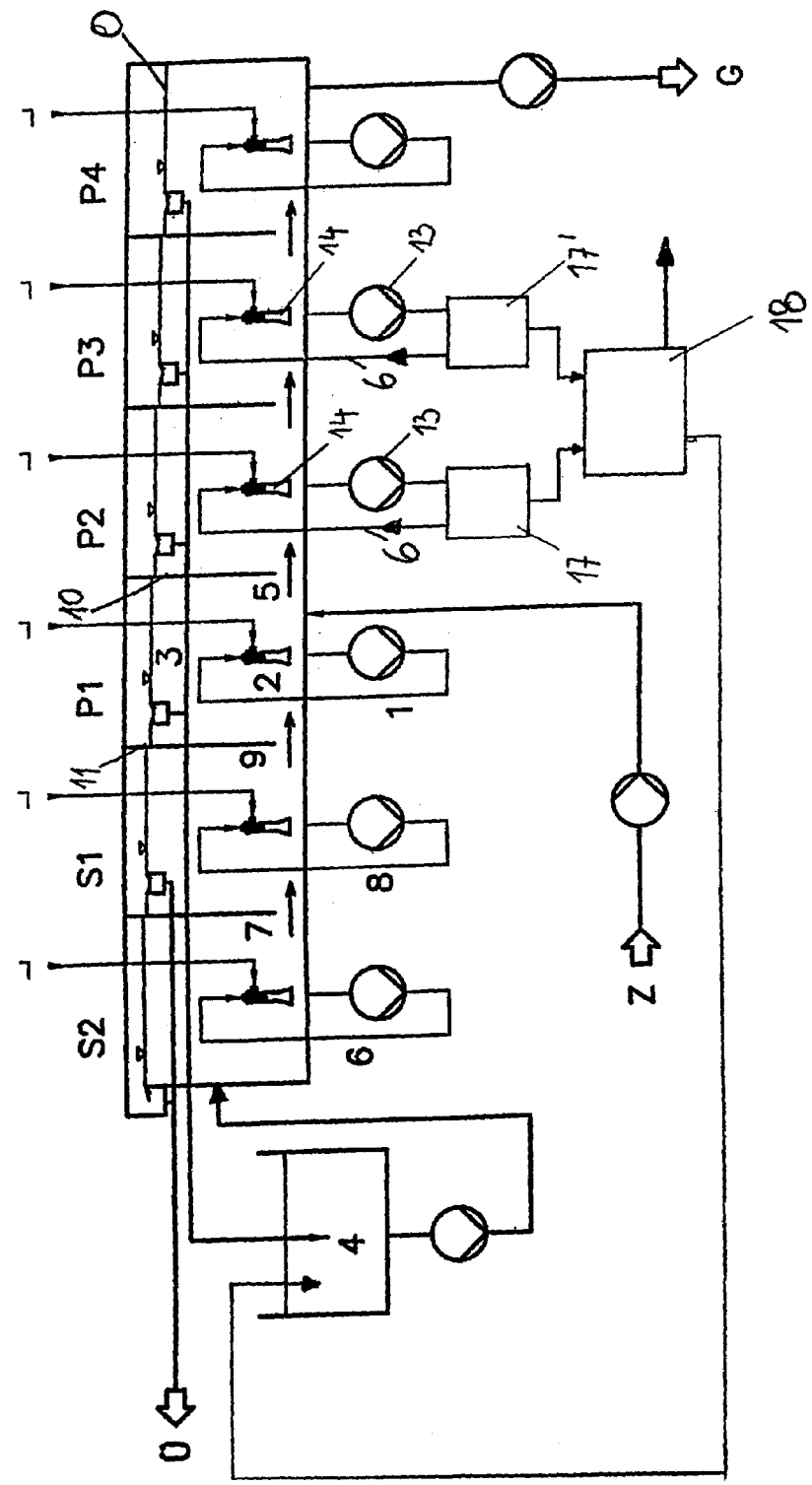
FIG. 4 is a schematic diagram of a third embodiment of flotation plant in accordance with the invention.

A further potential means of removing the dirt specks is shown in FIG. 4. Here, the dirt specks are removed in two partial flows. In order to further reduce fibre losses, the cleaners 17, 17' are cascaded. Here, each of the cleaners 17, 17' can be followed by a further washer for ash removal. The accept, now depleted of filler and coming from the next washer 18, is brought to the flotation foam tank 4 and undergoes further flotation together with the overflow foam from the primary cells to the secondary cells. The reject, which contains a high concentration of fillers and fines, goes through a DAF (Dissolved Air Flotation) unit or a sludge press before disposal.

Figure 5:
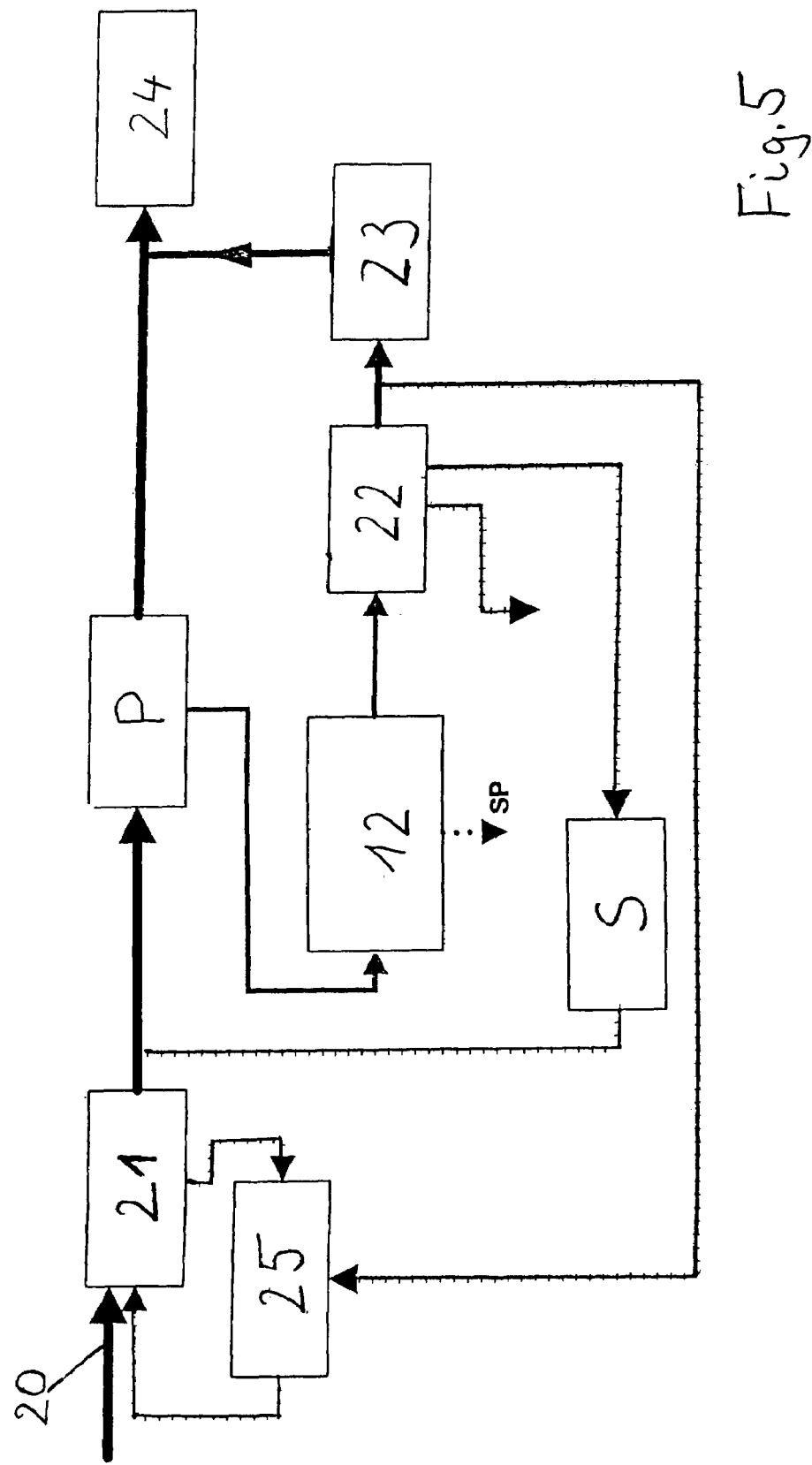
FIG. 5 is a schematic diagram of a variation of the subject cleaning process.

FIG. 5 shows a diagram with a potential variant of a dirt speck removal stage. The fibre pulp suspension to be cleaned undergoes medium-consistency slot screening 21 at 20 before being fed to the primary stage P of a flotation unit. A hydro-cyclone stage 12 is included in loop 6; it can be either single-stage or multi-stage, and may also include a degassing unit if necessary. The dirt specks and ink particles removed are discharged from the system at SP. For optimum cleaning, the cyclone is followed by a washing stage 22 for ash removal. The accept is returned to the accept flow at times through a medium-consistency slot screen 23, and is then fed to a low-consistency slot screen 24. If necessary, the reject flow from the washing stage is fed to a further secondary flotation stage S. If cleaning efficiency is good—depending on the characteristics of the raw material in each case—this stage may also be omitted entirely. As an alternative, the suspension can also be fed to a second stage 25 of a medium-consistency slot screen and added from there to the pulp suspension 20 ahead of the first stage 21 of the medium-consistency slot screen.

Figure 6:
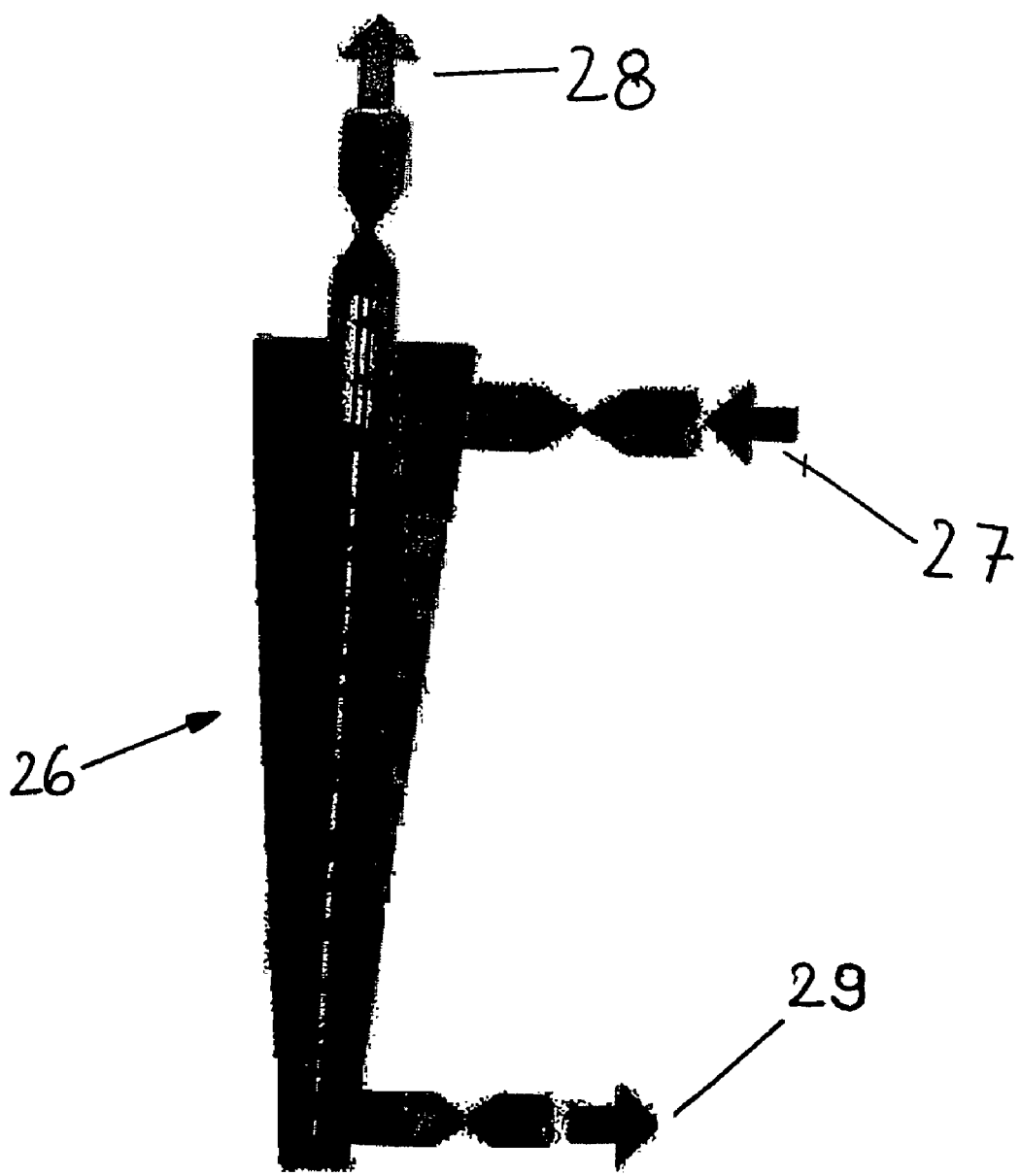
FIG. 6 is shows a cleaner in accordance with the invention.

FIG. 6 shows a variant of a cleaner in the form of a hydro-cyclone 26. The pulp flow 27 enters at a tangent, with the accept 28 then being drawn off in axial direction. The reject flow 29, containing a high concentration of dirt specks and ink particles, is removed at the base of the hydro-cyclone 26. Normally, a number of cyclones 26 of this type are connected and can be arranged either horizontally or in groups of two.

By removing a large percentage of the filler from the production flow and with additional removal of small ink particles, the brightness or whiteness increases as well.

While preferred embodiments have been shown and described, various modifications and substitutions may be made thereto without departing from the spirit and scope of the invention. Accordingly, it is to be:

What is claimed is:

1. A flotation device for aerating suspensions to produce an accept flow and a reject floats flow containing contaminants, the device comprising a plurality of flotation cells in flow communication with each other and each cell having a reject floats flow containing contaminants and an accept flow, each of the cells having an internal loop that is separate from the liquid loop of each other cell, and the internal liquid loop of at least one cell for removing additional contaminants from the suspension has a cleaner.

2. Device according to claim 1, wherein at least two cells each have a cleaner in their respective internal liquid loop.

3. Device according to claim 2, further comprising a washer, the flows from the cleaners being fed together to the washer.

4. Device according to claim 3, wherein the cleaners and washer are interposed into a loop of primary cells.

5. Device according to claim 1, further comprising a washer disposed downstream of the cleaner.

6. Device according to claim 1, wherein the cleaner is a hydro-cyclone or cyclone block.

7. Device according to claim 6, wherein the cyclone or cyclone block has a degassing unit.

8. Device according to claim 1, further comprising an injector pump providing a pressure increase of 1.0 to 2.5 bar.

9. Device according to claim 1, wherein the device has no secondary flotation cells.

10. Device according to claim 1, further comprising an injector pump providing a pressure increase of 1.2 to 1.6 bar.

11. A flotation device for aerating suspensions to produce an accept flow, and a rejects flow containing contaminants the device comprising a plurality of flotation cells in flow communication with each other and each cell having a rejects flow containing contaminants and an accept flow, at least two cells including a separate internal liquid loop, each internal liquid loop having a cleaner, the device further comprising a washer, wherein the flows from the cleaners are fed together to the washer.

* * * * *

UNITED STATES PATENT AND TRADEMARK OFFICE
CERTIFICATE OF CORRECTION

PATENT NO. : 7,267,231 B2  Page 1 of 1
APPLICATION NO. : 10/785848
DATED : September 11, 2007
INVENTOR(S) : Gabl It is certified that error appears in the above-identified patent and that said Letters Patent is hereby corrected as shown below:

<u>Column 6</u>:

Lines 3 and 4, after "cell" delete "for removing additional contaminants from the suspension".

Line 4, after "cleaner" insert --for removing additional contaminants from the suspension--.

Line 26, after "contaminants" insert --,--.

Signed and Sealed this

Eleventh Day of March, 2008

JON W. DUDAS
*Director of the United States Patent and Trademark Office*